United States Patent

Hosoi et al.

[11] Patent Number: 5,958,553
[45] Date of Patent: *Sep. 28, 1999

[54] BIAXIALLY ORIENTED, POLYETHYLENE-2, 6-NAPHTHALATE FILM AND MAGNETIC TAPE FORMED THEREFROM

[75] Inventors: Masahiro Hosoi, Tokyo; Hisashi Hamano; Yasuhiro Saeki, both of Sagamihara; Masami Etchu, Yokohama, all of Japan

[73] Assignee: Teijin Ltd., Osaka, Japan

[ * ] Notice: This patent is subject to a terminal disclaimer.

[21] Appl. No.: 08/795,317

[22] Filed: Feb. 3, 1997

Related U.S. Application Data

[62] Division of application No. 08/308,203, Sep. 19, 1994, Pat. No. 5,665,454, which is a continuation of application No. 07/949,854, Nov. 20, 1992, abandoned.

[30] Foreign Application Priority Data

Mar. 22, 1991 [JP] Japan .................................. 3-81103
Mar. 19, 1992 [WO] WIPO ..................... PCT/JP92/00338

[51] Int. Cl.$^6$ ........................... B32B 27/06; B32B 27/18; B32B 27/36
[52] U.S. Cl. ..................... 428/141; 428/323; 428/327; 428/331; 428/338; 428/339; 428/480; 428/694 SG; 428/910
[58] Field of Search ................... 428/141, 216, 428/327, 328, 329, 330, 331, 338, 480, 694 ST, 694 SG, 910, 339, 323

[56] References Cited

U.S. PATENT DOCUMENTS

| 4,316,927 | 2/1982 | Kimura et al. ........................ 428/216 |
| 4,833,019 | 5/1989 | Suwarnasarn ........................ 428/336 |
| 5,051,292 | 9/1991 | Katoh et al. ........................ 428/141 |
| 5,431,982 | 7/1995 | Nishiyama et al. ................. 428/141 |
| 5,431,983 | 7/1995 | Etchu et al. ........................ 428/141 |
| 5,618,609 | 4/1997 | Chujo et al. ........................ 428/141 |
| 5,665,454 | 9/1997 | Hosoi et al. ........................ 428/141 |

FOREIGN PATENT DOCUMENTS

| 0381212 | 2/1990 | European Pat. Off. . |
| 0381213 | 2/1990 | European Pat. Off. . |
| 50-45877 | 4/1975 | Japan . |
| 62-143938 | 6/1987 | Japan . |

OTHER PUBLICATIONS

Database WPI Week 7647, Derwent Publications Ltd., London GB; AN 76–87405X & JP–A–50 081 325 (Teijin) Jul. 2, 1975.

*Primary Examiner*—Vivian Chen
*Attorney, Agent, or Firm*—Sherman and Shalloway

[57] ABSTRACT

A biaxially oriented polyethylene-2,6-naphthalate film suitable for producing magnetic recording media wherein the film has a Young's modulus of at least 550 kg/mm$^2$ in the longitudinal direction and a Young's modulus of at least 800 kg/mm$^2$ in the transverse direction with the Young's modulus in the transverse direction being greater than the Young's modulus in the longitudinal direction by more than 200 kg/mm$^2$; a surface roughness Ra of 1–12 nm; and low heat shrinkage. The film also contains 0.005–2% by weight inorganic or organic fine particles.

12 Claims, No Drawings

5,958,553

BIAXIALLY ORIENTED, POLYETHYLENE-2, 6-NAPHTHALATE FILM AND MAGNETIC TAPE FORMED THEREFROM

This is a divisional of application Ser. No. 08/308,203 filed Sep. 19, 1994, U.S. Pat. No. 5,665,454, which is a continuation of application Ser. No. 07/949,854 filed Nov. 20, 1992, abandoned.

TECHNICAL FIELD

The present invention relates to a biaxially oriented, unidirectionally long polyethylene 2,6-naphthalate film and a magnetic tape formed therefrom. More specifically, it relates to a biaxially oriented, unidirectionally long polyethylene-2,6-naphthalate film useful as a base film for a magnetic recording medium which permits recording for a long period of time and gives a high-quality recorded image, and to a magnetic tape formed therefrom.

TECHNICAL BACKGROUND

Recently, a magnetic tape is increasingly required to meet long recording, and for long recording, it is required to store a longer tape in a tape reel package by decreasing the thickness of the tape. It is necessary to decrease the thickness of the base film for decreasing the total thickness of the tape. In this actual case, however, the stiffness of the tape decreases. As a result, in some cases, the tape edge is liable to be damaged in loading and unloading, or the tape is liable to be deformed to cause a strain in record when a high instantaneous pulling force is exerted on the tape. Therefore, the film for use as a base for a long-recording magnetic recording medium is required to have a high Young's modulus.

Further, with a camera-integrated VTR being widely used, the VTR is used outdoors or kept in an automobile, and the tape is often exposed to severe temperature conditions. Therefore, the tape is increasingly required to have dimensional stability sufficient to cause no skew strain, or ultimately, the base film is strongly required to have sufficient dimensional stability.

A biaxially oriented polyethylene terephthalate film has been conventionally used as a base film for a magnetic tape. A so-called supertensilized film whose Young's modulus in the longitudinal direction is increased for long recording has a Young's modulus of 850 kg/mm² at most, and in this case, the maximum Young's modulus in the transverse direction is 450 kg/mm² at most. On one hand, when the Young's modulus in the longitudinal direction is increased, the Young's modulus in the transverse direction inevitably decreases. As a result, the tape is liable to be damaged in the edge portion when running. On the other hand, when the Young's modulus in the width (lateral) direction is intended to be increased in the tape production, inevitably, no sufficient Young's modulus in the longitudinal direction can be obtained. As a result, the contact of the tape to a magnetic head comes to be poor, and an output fluctuation would occur. Further, a base film whose Young's modulus is increased by stretching it at a high stretch ratio has a problem in that it has low dimensional stability since there still remains a strain which has occurred in a step of film forming. Further, processing at a high stretch ratio has another problem in that the product yield decreases. Prior art techniques inevitably include a step of removing a residual strain by relaxation heat-treatment or aging treatment in a step of forming a base film or in a step of processing a tape, and involve complicated selection and combination of production conditions.

The field of use in magnetic recording has been recently increasingly requiring the achievement of high-density recording and high-quality recording, and a polyester film which constitutes a base film is increasingly required to be excellent in surface flatness and slipperiness and to be also excellent in running durability and abrasion resistance.

For improving lubricity, there has been conventionally proposed a method in which inert fine particles are incorporated into polyester or a method in which fine particles are allowed to precipitate in a polymerization system during the polyester synthesis. These methods are aimed at improving the lubricity of a film by forming protrusions derived from the fine particles on the film surface at the time when the film of polyester is formed. In the method of improving the slipperiness of a film by means of fine particles as described above, generally, the slipperiness is improved with an increase in the degree of surface roughening. However, on the other hand, the surface to which a magnetic coating composition is applied is roughened due to this surface roughening, and consequently, the electromagnetic conversion characteristic is deteriorated.

For solving the above contradictory flatness and lubricity, a variety of means have been proposed which allow large-sized particles and small-sized particles to be co-present in combination. However, these means also involve problems, and these means find it difficult to comply with the requirement to achieve a high grade, e.g., a high-density and high-quality, of a magnetic recording medium. The reasons therefor are as follows: The size of large-sized particles used in composite inert particles is too large and coarse to meet with the requirement for a quality of a high grade. Further, with an increase in the size of the large-sized particles, protrusions on the film surface have a greater height, at the same time the size of voids around particles increases, so that the high protrusions are abraded off in a calendering process. As a result, drop-out is caused. In addition, since it is difficult to control the distribution of the fine particle, it is difficult to adjust the protrusions on the film surface as designed.

SUMMARY OF THE INVENTION

It is an object of the present invention to provide a biaxially oriented, unidirectionally long polyethylene-2,6-naphthalate film.

It is another object of the present invention to provide a biaxially oriented, unidirectionally long polyethylene-2,6-naphthalate film whose Young's modulus in the transverse direction is greater than its Young's modulus in the longitudinal direction.

It is further another object of the present Invention to provide a biaxially oriented, unidirectionally long polyethylene-2,6-naphthalate film whose heat shrinkage in the longitudinal direction is very small and which does not cause any skew distortion when used as a magnetic tape.

It is still further another object of the present invention to provide a biaxially oriented, unidirectionally long polyethylene-2,6-naphthalate film which is useful for producing a magnetic recording medium having flatness, lubricity and durability suitable for use in the field of a high-quality magnetic recording.

Further, it is still another object of the present invention to provide a magnetic tape using the above unidirectionally long film as a base film.

Other objects and advantages of the present invention will be apparent from the following description.

According to the present invention, the above objects and advantages of the present invention are achieved, first, by a biaxially oriented, unidirectionally long polyethylene-2,6-naphthalate film (A) having a Young's modulus of at least 550 kg/mm$^2$ in the longitudinal direction and a Young's modulus of at least 600 kg/mm$^2$ in the transverse direction, the Young's modulus in the transverse direction being greater than the Young's modulus in the longitudinal direction, (B) having a heat shrinkage, after heat treatment at 70° C. for 1 hour under no load, of 0.1% or less, and (C) having a surface roughness, Ra, of 12 nm or less.

DETAILED DESCRIPTION OF THE INVENTION

In the present invention, the polyethylene-2,6-naphthalate constituting the film is a polymer having naphthalenedicarboxylic acid as a main acid component, and yet a small amount of other dicarboxylic acid component may be copolymerized. Further, ethylene glycol is a main glycol component of the polymer, and yet a small amount of other glycol component may be copolymerized.

The dicarboxylic acid component other than naphthalenedicarboxylic acid includes, for example, aromatic dicarboxylic acids such as terephthalic acid, isophthalic acid, diphenylsulphonedicarboxylic acid and benzophenonedicarboxylic acid; aliphatic dicarboxylic acids such as succinic acid, adipic acid, sebacic acid and dodecanedicarboxylic acid; and alicyclic dicarboxylic acids such as hexahydroterephthalic acid and 1,3-adamantanedicarboxylic acid.

The glycol component other than ethylene glycol includes, for example, 1,3-propanediol, 1,4-butanediol, 1,6-hexanediol, neopentyl glycol, 1,4-cyclohexanedimethanol and p-xylylene glycol. The above polymer may also contain additives such as a stabilizer and a colorant.

The above polyethylene-2,6-naphthalate can be generally produced by a known method according to a melt-polymerization method. In this case, additives such as a catalyst may be used optionally as required.

The polyethylene-2,6-naphtlialate preferably has an intrinsic viscosity in the range of 0.45 to 0.90.

In the biaxially oriented, unidirectionally long film of the present invention, the Young's modulus (EM) in the longitudinal direction is at least 550 kg/mm$^2$, preferably at least 600 kg/mm$^2$, more preferably at least 700 kg/mm$^2$. When a film whose Young's modulus in the longitudinal direction is 550 to 600 kg/mm$^2$ is used, the Young's modulus in the longitudinal direction of a tape can be maintained at a high level by increasing the strength of a magnetic binder. However, when a film having a Young's modulus of less than 550 kg/mm$^2$ is used, and particularly in the case of producing a long-recording and long-reproducing magnetic tape having a base film thickness of 12 μm or less and a tape thickness of 16 μm or less, the Young's modulus of the resulting tape is insufficient even if a magnetic binder having high strength is used. As a result, the tape edge sometimes bends or the tape is sometimes elongated in the traveling of the tape.

In the biaxially oriented, unidirectionally long film of the present invention, further, the Young's modulus (ET) in the transverse direction is at least 600 kg/mm$^2$, preferably at least 700 kg/mm$^2$, more preferably at least 800 kg/mm$^2$. With this Young's modulus, the damage on the tape edge in the traveling of the tape can be prevented. When the Young's modulus in the transverse direction is less than 600 kg/mm$^2$, the damage on the tape edge cannot be prevented even if a magnetic binder having high strength is used. Further, the Young's modulus (ET) in the transverse direction is required to be greater than the Young's modulus (EM) in the longitudinal direction. The Young's modulus (ET) in the transverse direction is greater than the Young's modulus (EM) in the longitudinal direction by at least 100 kg/mm preferably by at least 200 kg/mm$^2$, particularly preferably by at least 300 kg/mm$^2$. When the Young's modulus in the transverse direction is lower than the Young's modulus in the longitudinal direction, the contact (head touch) between the tape and the rotary head of a videotape recorder is insufficient, and undesirably, there occurs a problem that an output is not sufficient when a recorded signal is reproduced.

In the biaxially oriented, unidirectionally long film of the present invention, the heat shrinkage of the base film in the longitudinal direction after heat treatment under no load at 70° C. for 1 hour is required to be 0.1% or less. It is preferably not more than 0.08%, more preferably not more than 0.05%. When this heat shrinkage in the longitudinal direction is larger than 0.1%, undesirably, the degree of a skew of the magnetic tape increases, a distortion sometimes appears on the screen of a TV set, and valuable recording becomes useless in some cases.

For decreasing the heat shrinkage of a film having a high Young's modulus to the above range, a heat-treated film is heated under low tension to relax the film in the longitudinal direction in a production process to be described later. The relaxation in the longitudinal direction can be carried out, for example, by a method in which a film is relaxed while it is in a non-contact state under heat and low tension according to a pneumatic floating method; by a method in which a film is relaxed by means of a speed difference between a heating roll having a nip roll and a cooling roll having a nip roll; or by a method in which a film is relaxed in the longitudinal direction by stepwise decreasing the traveling speed of clips holding the film in a center. Any of the above methods can be used if it permits to produce the relaxation in the longitudinal direction.

The biaxially oriented, unidirectionally long film of the present invention is also required to have a surface roughness (Ra) of 12 nm or less. Preferred are those having a surface roughness in the range of 1 to 12 nm. Those having a surface roughness of 1 to 5 nm are excellent in electromagnetic conversion characteristic when formed into magnetic tapes in particular. For example, when a back coating for lubricity is applied for Improving the handling properties of the base film, there can be obtained a magnetic tape excellent both in electromagnetic conversion characteristic and running properties. Further, those having a surface roughness of 5 to 12 nm are excellent in handling properties as a base film, and it has been found that such base films are excellent in running properties and excellent in electromagnetic conversion characteristic even without any back coating for lubricity when formed into magnetic tapes. When Ra is more than 12 nm, it is difficult to maintain the electromagnetic conversion characteristic required of a magnetic tape for high-density recording, while when Ra is less than 1 nm, the film has a very large coefficient of friction, and the film is poor in handling properties and cannot be taken up in a roll form.

The biaxially oriented, unidirectionally long film of the present invention preferably has a large number of fine protrusions on the surface. According to the present invention, it is desired that a large number of such fine protrusions are derived from a large number of inert fine particles contained and dispersed in polyethylene-2,6-naphthalate.

The polyethylene-2,6-naphthalate containing a dispersion of such fine particles can be produced, generally, by adding the fine particles to a reaction system during a reaction for forming the polyethylene-2,6-naphthalate, e.g., at any time during an ester-interchange reaction or a polycondensation reaction when the reaction is carried out by an ester-interchange method, or at any time when the reaction is carried out by a direct polymerization method. It is preferable to add the fine particles at an initial stage of the polycondensation reaction, for example, until the intrinsic viscosity reaches about 0.3.

The volume shape factor (f), which is defined as follows, $$f = V/D^3$$

wherein V is the average volume ($\mu m^3$) per piece of particles, D is the average maximum particle diameter ($\mu m$) of the particles, is preferably greater than 0.3 and not more than $\pi/6$.

It should be understood that the average maximum diameter (D) in the above definition refers to the distance having the largest length among distances between two points formed when any lines crossing a particle come across the circumference of the particle.

The above fine particles preferably have an f value of 0.35 to $\pi/6$. In this case, particles having an f value of $\pi/6$ are spherical. When fine particles having an f value of smaller than 0.3 are used, it is difficult to control various film surface properties.

In the present invention, the aspect ratio (length/width) of the fine particles to be contained and dispersed in the polyethylene-2,6-naphthalate is 1.0 to 1.2, preferably 1.0 to 1.15, more preferably 1.0 to 1.1. Preferred are fine particles of which individual particle is nearly spherical in its shape.

The average particle diameter of the fine particles is 0.2 to 2.5 $\mu m$, preferably 0.3 to 2.5 $\mu m$, more preferably 0.4 to 0.1 $\mu m$, particularly preferably 0.4 to 0.8 $\mu m$. When the fine particles have an average particle diameter of less than 0.2 $\mu m$, no sufficient slipperiness of a film can be obtained. On the other hand, when the average particle diameter exceeds 2.5 $\mu m$, the protrusions on the film surface are too high to obtain adequate electromagnetic conversion characteristic.

The length, width and the diameter as a diameter of a circle converted from an area, of the fine particle are determined by vapor-depositing a metal on particle surface and magnifying the particle at 10,000 to 30,000 magnification with an electron microscope, and the average particle diameter and the aspect ratio are determined by the following equations.

Average particle diameter=total of the diameters as the diameter of a circle converted from an area, of measured particles/number of measured particles Aspect ratio=average length of fine particles/average width of the fine particles These fine particles preferably have a sharp particle size distribution. The relative standard deviation for showing sharpness of the distribution is preferably not more than 0.5, more preferably not more than 0.4, particularly preferably not more than 0.3.

The relative standard deviation is represented by the following equation.

Relative standard deviation = $\sqrt{\dfrac{\sum_{i=1}^{n}(Di - DA)^2}{n}} \Big/ DA$ wherein:
  Di: diameter ($\mu m$), as the diameter of a circle converted from an area of individual particle
  DA: average value of diameters as the diameter of a circle converted from an area, $$\left( = \dfrac{\sum_{i=1}^{n} Di}{n} \right)(\mu m)$$

n: number of particles.

The fine particles having a relative standard deviation of not more than 0.5 have a spherical shape and a very sharp particle size distribution. Therefore, such fine particles give a polyethylene-2,6-naphthalate film which has a very uniform distribution of protrusions having uniform heights on the surface and has excellent slipperiness.

The kind of the fine particles and the process for the production thereof are not at all limited if the fine particles satisfy the above conditions. The amount of the fine particles based on the polyethylene-2,6-naphthalate is 0.005 to 2.0% by weight, preferably 0.01 to 0.6% by weight, particularly preferably 0.05 to 0.5% by weight.

Examples of the above fine particles preferably include monodisperse spherical fine particles of silica, spherical fine particles of a silicone resin, and spherical fine particles of crosslinked polystyrene.

The above spherical fine particles of silica differ from ultrafine massive particles having a particle diameter of about 10 nm or aggregates formed by aggregation of these ultrafine massive particles, which are conventionally used as a lubricant. The above spherical fine particles of silica can be produced, for example, by hydrolyzing alkoxysilane (e.g., tetramethoxysilane, tetraethoxysilane or tetrabutoxysilane) in a medium.

The above spherical fine particles of a silicone resin have a composition of the following formula (A),

$$R_xSiO_{2-x/2} \tag{A}$$

wherein R is a hydrocarbon group having 1 to 7 carbon atoms, and x is a number of from 1 to 1.2.

R in the above formula (A) is a hydrocarbon group having 1 to 7 carbon atoms, and it is preferably an alkyl group having 1 to 7 carbon atoms, phenyl or tolyl. The alkyl group having 1 to 7 carbon atoms may be linear or branched, and includes methyl, ethyl, n-propyl, isopropyl, n-butyl, isobutyl, tert-butyl, n-pentyl and n-heptyl. Of these, methyl and phenyl are preferred, and methyl is particularly preferred. "x" in the above formula (A) is a number of from 1 to 1.2. The above formula (A) in which x is 1 means the following formula (A)-1, $$RSiO_{1.5} \tag{A-1}$$

wherein R is as defined above.

The composition of the above formula (A)-1 is derived from the following structural portion of the three-dimensional polymer chain structure of a silicone resin.

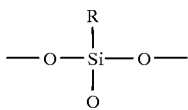

The above formula (A) in which x is 1.2 means the following formula (A)-2, $$R_{1.2}SiO_{1.4} \qquad (A)\text{-}2$$

wherein R is as defined above.

It can be understood that the composition of the above formula (A)-2 is composed of 0.8 mol of the structure of the above formula (A)-1 and 0.2 mol of the structure of the following formula (A)', $$R_2SiO \qquad (A)'$$

wherein R is as defined above.

The above formula (A)' is derived from the following structural portion of the three-dimensional polymer chain of a silicone resin.

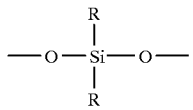

As is clear from the above explanations, it can be understood that the composition of the above formula (A) is composed substantially of the structure of the above formula (A)-1 only or composed of a structure in which the structure of the above formula (A)-1 and the structure of the above formula (A)-2 are randomly co-present in proper proportions.

In the spherical fine particles of a silicone resin, preferably, "x" in the above formula (A) has a value between 1 and 1.1. The spherical fine particles of a silicone resin can be produced, for example, by hydrolyzing and condensing trialkoxysilane of the following formula, $$RSi(OR')_3$$

wherein R is a hydrocarbon group having 1 to 7 carbon atoms and R' is a lower alkyl group, or a partial hydrolysis condensate thereof in the presence of ammonia or an amine such as methylamine, dimethylamine or ethylenediamine with stirring.

According to the above method using the above starting material, the fine particles of a silicone resin having the composition of the formula (A)-1 can be produced. According to the above method using, for example, dialkoxysilane of the following formula, $$R_2Si(OR')_2$$

wherein R and R' are as defined above, in combination with the above trialkoxysilane, the fine particles of a silicone resin having the composition of the above formula (A)-2 can be produced.

Further, the above spherical fine particles of crosslinked polystyrene are not at all limited concerning their production process, etc., if they satisfy the above-described conditions. For example, the spherical particles of crosslinked polystyrene can be obtained by preparing an emulsion of polymer particles through the emulsion polymerization of a styrene derivative monomer such as a styrene monomer, a methylstyrene monomer, a-methylstyrene monomer or a dichlorostyrene monomer together with one, two or more monomers selected from conjugated diene monomers such as butadiene, nitrile monomers such as acrylonitrile, methacrylate monomers such as methyl methacrylate, functional monomers such as unsaturated carboxylic acid, monomers having hydroxyl such as hydroxyethyl methacrylate, monomers having an epoxy group such as glycidyl methacrylate and unsaturated sulfonic acid, and a polyfunctional vinyl compound, as a crosslinking agent for forming a three-dimensional structure of polymer particles, such as divinylbenzene, ethylene glycol dimethacrylate, trimethylolpropane triacrylate or diallyl phthalate in a water-soluble medium in which a water-soluble polymer is dissolved as protective colloid, recovering the polymer particles from the emulsion, drying them, milling them with a jet mill, and then classifying them.

In the present invention, the film may contain other inert fine particles together with the above fine particles. Examples of the inert fine particles preferably include (1) conventional silicon dioxide; (2) alumina; (3) silicate containing at least 30% by weight of $SiO_2$ [e.g., amorphous or crystalline clay mineral, aluminosilicate (including a calcined product and hydrate), chrysotile, zircon and fly ash]; (4) oxides of Mg, Zn, Zr and Ti; (5) sulfates of Ca and Ba; (6) phosphates of Li, Ba and Ca (including monohydrate and dihydrate); (7) benzoates of Li, Na and K; (8) terephthalates of Ca, Ba, Zn and Mn; (9) titanates of Mg, Ca, Ba, Zn, Cd, Pb, Sr, Mn, Fe, Co and Ni; (10) chromates of Ba and Pb; (11) carbon (e.g., carbon black and graphite); (12) glass (e.g., glass powder and glass beads); (13) carbonates of Ca and Mg; (14) fluorite; and (15) ZnS. More preferred are anhydrous silicate, hydrous silicate, aluminum oxide, aluminum silicate (including a calcined product and hydrate), monolithium phosphate, trilithium phosphate, sodium phosphate, calcium phosphate, barium phosphate, titanium oxide, lithium benzoate, double salts (including hydrates) of these compounds, a glass powder, clay (including kaolin, Bakelite and terra abla), talc and calcium carbonate. Particularly preferred are silicon dioxide and calcium carbonate.

Further, the present invention may use internally precipitated fine particles, which hardly cause voids, in combination with spherical fine particles of silica, spherical fine particles of silicone and/or fine particles of crosslinked polystyrene as relatively large particles, whereby there can be provided a film having advantages of the use of two types of particles, which is excellent in running properties, abrasion resistance, fatigue resistance, electric insulation and transparency.

The above internally precipitated particles are those which are formed/precipitated from a catalyst residue, etc., during the production of polyethylene-2,6-naphthalate to be contained in the polymer. A dispersion thereof can be contained by a conventionally known method for forming internally precipitated particles. For example, there may be employed a method disclosed in JP-A-48-61,556, JP-A-51-112860, JP-A-51-115,803, JP-A-53-41,355 and JP-A-54-90, 397. Preferably, the internally precipitated particles are formed between a stage at which the monomer formation reaction substantially finishes and an initial stage of the polycondensation reaction. Examples of the catalyst for the monomer formation reaction and the compound to be added at this reaction stage include calcium compounds and lithium compounds. Examples of components forming these calcium compounds and lithium compounds include aliphatic carboxylic acids such as acetic acid, propionic acid and butyric acid; alcohols such as methyl alcohol, ethyl alcohol, propyl alcohol and butyl alcohol; glycols such as ethylene glycol and propylene glycol: chlorine and hydrogen.

The internally precipitated particles are generally formed by adding a phosphorus compound to a system where the above-described compounds are present. Examples of the phosphorus compound include phosphoric acid, phosphorous acid and esters of these (e.g., alkyl ester and aryl ester). For the formation, particle size adjustment and stabilization of the internally precipitated particles, other additives (e.g., lithium phosphate) may be used. The internally precipitated particles containing calcium, lithium and phosphorus have a relatively large particle diameter, and those containing lithium and phosphorus have a relatively small particle diameter. Therefore, the composition thereof may be changed depending upon the desired particle diameter. As the internally precipitated particles, preferred are particles containing 0.03 to 5% by weight of lithium atoms, 0.03 to 5% by weight of calcium atoms and 0.03 to 10% by weight of phosphorus atoms.

In the present invention, the average particle diameter of the other inert fine particles is preferably 0.01 to 2.5 μm, more preferably 0.05 to 2.0 μm, particularly preferably 0.1 to 1.5 μm, the most preferably 0.1 to 1.0 μm. The content of these fine particles based on the polyethylene-2,6-naphthalate is preferably 0.005 to 0.25% by weight, more preferably 0.01 to 0.20% by weight, particularly preferably 0.01 to 0.15% by weight, the most preferably 0.05 to 0.10% by weight.

For determining the particle diameter and amount, the internally precipitated fine particles are first separated from polyethylene-2,6-naphthalate by, for example, a method to be described later.

The separation of particles from polyethylene-2,6-naphthalate or a film thereof can be performed as follows.

Polyethylene-2,6-naphthalate or a polyethylene-2,6-naphthalate film is fully washed with methanol to remove substances adhering to the surface, washed with water and dried. 500 Grams of the film is sampled, and 4.5 kg of o-chlorophenol is added to the film. The temperature of the solution is elevated up to 100° C. while stirring, and then allowed to stand as it is for 1 hour to dissolve the polyethylene-2,6-naphthalate portion. In the case where the film is too highly crystallized to dissolve the polyethylene-2,6-naphthalate portion, the film is once melted, rapidly cooled and then subjected to the above dissolving procedures. Then, the above solution is filtered through a C-1 glass filter for removing coarse insolubles such as impurities contained in, or reinforcing agents added to, polyethylene-2,6-naphthalate, and the weight of the removed materials is deducted from the sample weight. The separation can be completed in about 40 minutes. If necessary, the completion can be confirmed by checking the light transmittance of the solution at 375 μm, since the solution after the separation shows a transmittance value which is constant but higher than that of the solution before the separation. After the separation, a supernatant is removed by a decantation method to obtain the separated particles.

The separated particles might contain a polyester content caused by insufficient separation. Therefore, o-chlorophenol having room temperature is added to the recovered particles to form a nearly uniform suspension, and the suspension is treated with an ultracentrifugal separator. It is necessary to repeat these procedures until the melting peak belonging to the polymer is not detected when the particles to be described later are dried and analyzed by scanning differential calorimetry. Finally, the so-obtained, separated particles are vacuum-dried at 120° C. for 16 hours, and then weighed.

The separated particles obtained by the above procedures include the internally precipitated particles and other fine particles. It is therefore required to determine the amount of the internal particles and the amount of other fine particles separately. At first, the above separated particles are quantitatively analyzed on metal contents to determine the contents of Ca and Li and the contents of metals other than Ca and Li. Then, the separated particles are heated under reflux in ethylene glycol in a molar amount of three times equivalent thereof for at least 6 hours. Then, the temperature is increased to 200° C. or higher to distill off ethylene glycol and depolymerize the internally precipitated particles alone to be dissolved in ethylene glycol. The separated particles obtained by centrifugal separation of the remaining particles are dried and weighed to obtain an amount of the added particles, and a balance obtained by deducting the amount of the added particles from the initial total amount of the particles is taken as an amount of the internally precipitated particles. The internally precipitated particles may contain a trace amount of other metal components such as zinc, manganese, magnesium, cobalt or antimony, germanium and titanium to such an extent that the effects of the present invention are not hampered.

The biaxially oriented, unidirectionally long polyethylene-2,6-naphthalate film of the present invention can be produced, for example, by melt-extruding polyethylene-2,6-naphthalate at a temperature between the melting point (Tm: C) of polyethylene-2,6-naphthalate and (Tm+70)° C. to obtain an unstretched film having an intrinsic viscosity of 0.35 to 0.9 dl/g, stretching the unstretched film uniaxially (longitudinally or laterally) at a temperature between (Tg−10)° C. and (Tg+70)° C. (wherein Tg stands for the glass transition temperature of polyethylene-2,6-naphthalate) at a stretch ratio of 2.5 to 7.0, and then, stretching the uniaxially stretched film at right angles to the above stretching direction (laterally in this second stage stretching if the first stage stretching has been carried out longitudinally) at a temperature between Tg (°C.) and (Tg+70)° C. at a stretch ratio of 2.5 to 7.0. In this case, the area stretch ratio is preferably 9 to 35, more preferably 12 to 35. The stretching means may be means of simultaneous biaxial stretching or means of consecutive biaxial stretching. Further, the biaxially oriented film may be heat set at a temperature between (Tg+70)° C. and Tm (°C.). For example, it is preferred to heat set the biaxially oriented film at a temperature between 190° C. and 250° C. The time required for the thermosetting is generally 1 to 60 seconds.

Further, when it is intended to improve the mechanical properties, the stretching shall not be limited to the above two-stage stretching. A biaxially oriented, unidirectionally long film having further improved mechanical properties can be obtained by heat setting the above-obtained biaxially oriented film at a heat setting temperature between (Tg+20)° C. and (Tg+70)° C., stretching it either longitudinally or transversely at a temperature higher than the heat setting temperature by 10 to 40° C., and further stretching it either longitudinally or transversely at a temperature higher than this temperature by 20 to 50° C. such that the total stretch ratio in the longitudinal direction is 5.0 to 8.0 and that the total stretch ratio in the transverse direction is 5.0 to 8.0. The stretching method may be any one of a simultaneous biaxial stretching method and a consecutive biaxial stretching method. Further, the numbers of stretching operations in the longitudinal and transverse directions shall not be limited to the above, and the above unstretched film may be stretched in the longitudinal and transverse directions several times each.

In any method, the biaxially oriented film may be finally heat set at a temperature between (Tg+70)° C. and Tm (° C.). For example, it is preferred to heat set the biaxially oriented film at a temperature between 190° C. and 250° C. The time for the heat setting is generally 1 to 60 seconds.

Although not specially limited, the thickness of the biaxially oriented, unidirectionally long polyethylene-2,6-naphthalate film of the present invention is preferably not more than 36 µm. Further, to cope with a decrease in the film thickness of the base film due to improvement in the strength of a magnetic layer, the above thickness is more preferably not more than 25 µm, further preferably not more than 19 µm. Furthermore, to cope with commercial demands for a decrease in the size of machines and a decrease in the thickness of a long-time recording medium, the base film thickness is preferably not more than 15 µm, more preferably not more than 12 µm, particularly preferably in the range of from 2 to 12 µm.

The biaxially oriented, unidirectionally long polyethylene-2,6-naphthalate film of the present invention preferably has a friction coefficient (µk) of not more than 0.35 at a running time. When this film is used as a base for a magnetic tape, the degree of abrasion of the base film due to contact friction thereof with a running portion of a magnetic record reproducing apparatus (hardware) is very low, the tape shows excellent durability, and high electromagnetic conversion characteristic can be obtained.

Further, the biaxially oriented, unidirectionally long polyethylene-2,6-naphthalate film of the present invention has advantages in that it can be excellently taken up in a roll form at the time of a film-formation, that it hardly cockles when taken up, and further that it can be stably and sharply cut at a slitting stage.

Due to a combination of the advantages detailedly described above with the advantages at a film-forming time, the film of the present invention is suitable as a base for magnetic recording media of a high grade, e.g., a long-time recording ultrathin medium for audio and video use and high-density magnetic recording media (e.g., a metal or vapor deposited magnetic recording medium).

According to the present invention, therefore, there is also provided a magnetic recording medium produced by forming a magnetic layer on one surface or each surface of the above biaxially oriented, unidirectionally long polyethylene-2,6-naphthalate film. The magnetic layer and the method for forming the magnetic layer on a base film are known per se, and known magnetic layers and known methods for forming the magnetic layer can be also employed in the present invention. For example, when the magnetic layer is formed on the base film by coating a magnetic coating composition on the base film, the ferromagnetic powder for use in the magnetic layer includes known ferromagnetic materials such as $\gamma\text{-Fe}_2\text{O}_3$, Co-containing $\gamma\text{-Fe}_3\text{O}_4$, Co-coated $\text{Fe}_3\text{O}_4$, $\text{CrO}_2$ and barium ferrite. The binder for use with the magnetic powder includes known thermoplastic resins, thermosetting resins, reactive resins and mixtures of these. Examples of these resins include a vinyl chloride-vinyl acetate copolymer and polyurethane elastomer.

The magnetic coating composition may further contain an abrasive (e.g., $\alpha\text{-Al}_2\text{O}_3$), an electrically conductive material (e.g., carbon black), a dispersant (e.g., lecithin), a lubricant (e.g., n-butyl stearate and lecithin), a curing agent (e.g., an epoxy resin), and a solvent (e.g., methyl ethyl ketone, methyl isobutyl ketone and toluene).

Hereinafter, the present invention will be further explained by reference to Examples.

The physical property values and characteristics in the present invention were measured, and are defined, as follows.

(1) Young's modulus

A film is cut to prepare a sample having a width of 10 mm and a length of 150 mm, and the sample is pulled with an Instron typy universal tensile tester at an interchuck distance of 100 mm, at a pulling rate of 10 mm/minute and at a chart rate of 500 mm/minute. The Young's modulus is calculated on the basis of a tangent in a rising portion of the resultant load-elongation curve.

(2) Heat shrinkage

A film having a length of about 30 cm and a width of 1 cm, which has been accurately measured for its length in advance, is placed, under no load, in an oven set at 70° C., and heat-treated for 1 hour. Then, the film is taken out of the oven, allowed to stand until it has a room temperature, and measured for a length to determine a change in the length. The heat shrinkage is determined on the basis of the length before heat treatment ($L_0$) and a heat treatment-induced dimensional change ($\Delta L$) and according to the following equation, $$\text{Heat shrinkage (\%)} = \frac{\Delta L}{L_0} \times 100$$

(3) Skew

A video tape used for recording at an ordinary temperature (20° C.) at an ordinary humidity (60% RH) is heat-treated at 70° C. for 1 hour, and thereafter, the tape is played back at an ordinary temperature at an ordinary humidity. At this time, a skew deviation is measured at a head switching point.

(4) Size, etc., of particles (4-1) Spherical particles of silica, spherical particles of silicone and spherical particles of crosslinked polystyrene had the following situations when measured for their particle sizes.

1) Case where fine powders are measured for an average particle diameter, aspect ratio, etc.:

2) Case where fine particles in a film are measured for an average particle diameter, aspect ratio, etc.:

1) Case of fine powders:

Fine powders are placed so scatteringly on a sample stage of an electron microscope that overlapping of the powder particles is avoided as much as possible. A thin gold vapor-deposited film having a thickness of 200 to 300 angstroms is formed on each particle surface with a gold-sputtering apparatus. The powder particles are observed with a scanning electron microscope at magnification of 10,000 to 30,000 diameters, and at least 100 particles were measured for a maximum diameter (Dli), a minimum diameter (Dsi) and a diameter as the diameter of a circle converted from an area, (Di), each with Luzex 500, supplied by Nihon Regulator Co., Ltd. And, the number average values of these, expressed by the following equations, are taken as the maximum diameter (Dl), minimum diameter (DS) and average particle diameter (DA) of the spherical fine particles.

$$Dl = \left(\sum_{i=1}^{n} Dli\right)/n$$

$$DS = \left(\sum_{i=1}^{n} Dsi\right)/n$$

$$DA = \left(\sum_{i=1}^{n} Di\right)/n$$

(2) Case of spherical fine particles in a film

A small strip of a sample film is fixed on a sample stage of a scanning electron microscope, and the sample surface is ion-etched with a sputtering apparatus (JFC-1100 ion-sputtering apparatus) supplied by Nippon Denshi K. K. under the following conditions. The sample is placed in a bell jar, and the vacuum degree is increased up to a vacuum state of about $10^{-3}$ Torr. The ion etching is carried out at a voltage of 0.25 KV and a current of 12.5 mA for about 10 minutes. Further, gold is sputtered on the film surface with said apparatus, and the film surface is observed with a scanning electron microscope at magnification of 10,000 to 30,000 diameters to determine a maximum diameter (Dli), a minimum diameter (Dsi) and a diameter as the diameter of a circle converted from an area, (Di) of each of at least 100 particles with Luzex 500 supplied by Nihon Regulator Co., Ltd. Thereafter, the procedures of the above 1) are repeated.

(4-2) In re other inert particles

Average particle diameter (DP)

Particles are measured for diameters with a CP-50 type centrifugal particle size analyzer supplied by Shimadzu Corporation. On the basis of the resultant centrifugal sedimentation curve, there is prepared a cumulative curve of particle diameters of the individual particles and their amounts. In the cumulative curve, a particle diameter corresponding to a 50 mass percent is read, and taken as the above average particle diameter (see Book "Technique of Particle Size Measurement (Ryukei Sokutei Gijutsu"), pages 242 to 247, issued by Nikkan Kogyo Shimbunsha, 1975).

(5) Surface roughness (Ra) of film

A chart (film surface roughness curve) is prepared by using a needle-contacting type surface roughness tester (Surfcoder 30 C) supplied by Kosaka Laboratory Ltd. with a needle radius of 2 µm under a needle pressure of 30 mg. A portion having a measured length L is picked up from the film surface roughness curve in the direction of its center line. The center line of this portion picked up is taken as an X axis, the direction of the length multiplication is taken as a Y axis, and the roughness curve is expressed as Y=f(x). The value (Ra; nm) given by the following equation is defined as a film surface roughness.

$$Ra = \frac{1}{L}\int_{0}^{L} |f(x)| dx$$

(6) Friction coefficient (µk) of film

Under an environment having a temperature of 20° C. and a humidity of 60%, a film cut to have a width of ½ inch is moved (frictionally) at a speed of 200 cm/minute while it is brought into contact with a fixed rod (surface roughness equivalent to 0.1 to 1.0 µm: outer diameter 5 mm) made of stainless steel (SUS 304) at an angle $\theta=(152/180)\pi$ radian (152°). The tension $T_1$ at the inlet is adjusted to 35 g by a tension controller, and a tension is detected with an outlet tension detector, and the running friction coefficient µk is calculated by the following equation.

$$\mu k=(2.303/\theta)\log(T_2/T_1)=0.868\log(T_2/35)$$

(7) Abrasion

The abrasion of a running surface of a film is evaluated with a five-roll minisuper calender. The film is allowed to run through the five-roll calender consisting of nylon rolls and steel rolls at a treatment temperature of 80° C. under a linear film contact pressure of 200 kg/cm at a film speed of 50 m/minute. The abrasion of the running film is evaluated on the basis of the degree of dirt adhering to the top roll of the calender when the film has run in the total distance of 2,000 m.

<Evaluation at four ratings>

◎: no dirt on nylon roll

○: almost no dirt on nylon roll

X : dirt on nylon roll

XX: heavy dirt on nylon roll (8) Frequency of damage occurrence on tape

A tape is set at a commercially available VTR of a VHS system and allowed to run for 1 minute. Then, the tape is stopped from running and taken out. The tape portion as it has run above is loaded and unloaded 30 times. Its used portion is visually examined to see whether damage has occurred on the tape surface. Thirty rolls of one tape are tested in the same manner as above, and evaluated as follows.

X: Damage occurs on 5 rolls or more

Δ: Damage occurs on 3 or 4 rolls

○: Damage occurs on 2 rolls or less (9) Electromagnetic conversion characteristics (chroma S/N)

A signal obtained by superimposing a 100% chroma level signal on a 50% white level signal (a 100% level signal has a peak-to-peak voltage of 0.714 V) is recorded by using a commercially available home-use VTR, and its reproduced signal is measured with a Shibasoku noisemeter (model 925R). According to the definition of Shibasoku, the chroma S/N is defined as follows.

$$\text{Chroma } S/N \text{ (dB)} = 201 \log \frac{ES(p-p)}{EN(rms)}$$

wherein:

ES(p—p) is the peak-to-peak voltage difference (p-p) of a reproduced signal of a white level signal, ES(p—p)=0.714 V(p—p), EN(rms) is a root-mean-square value of a voltage of the reproduced signal of a chroma level signal, and EN(rms)=AM noise rms voltage (V). (10) Drop-out Drop-outs at 5 µsec×10 dB are counted with a commercially available drop-out counter (e.g., Shibasoku VH01BZ model), and calculated into a count number in 1 minute.

EXAMPLE 1

Pellets of polyethylene-2,6-naphthalate (homopolymer: PEN) containing 0.20% by weight of spherical fine silica particles having an average particle diameter of 0.27 µm, and having an intrinsic viscosity of 0.62 were dried at 170° C. for 4 hours. The pellets were melt-extruded by a usual method to obtain an unstretched film having a thickness of 330 µm. Subsequently, the unstretched film was consecutively stretched at a stretch ratio of 5.0 in the longitudinal direction at 130° C. and then, at a stretch ratio of 5.0 in the transverse direction at 135° C. Further, the stretched film was stretched in the transverse direction at a stretch ratio of 1.3 while it was heat set at 200° C. Then, the heat set, biaxially oriented polyethylene-2,6-naphthalate film was heated up to 110° C. with a heating roll, and then its heat shrinkage in the longitudinal direction was adjusted to 0.03% by adjusting the tension thereof between the heating roll and a cooling roll. The so-obtained film had a thickness of 10 µm.

A magnetic coating composition containing the following components was applied to the above-obtained biaxially oriented film with a gravure roll, and smoothened with a doctor knife. Before the magnetic coating composition was dried, it was magnetically oriented by a usual method. Then, the film was introduced into an oven, and the magnetic coating composition was dried and cured. Further, the film was calender-processed to give a coating having a uniform thickness of about 4 µm.

| | |
|---|---|
| Co-containing iron oxide powder | 100 parts by weight |
| Estek A | 10 parts by weight |
| (vinyl chloride-vinyl acetate copolymer supplied by Sekisui Chemical Co., Ltd.) | |
| Nippolan 2304 | 10 parts by weight |
| (polyurethane elastomer supplied by Nippon polyurethane Industries Co., Ltd) | |
| Coronate L | 5 parts by weight |
| (polyisocyanate supplied by Nippon Polyurethane Industries Co., Ltd.) | |
| Lecithin | 1 part by weight |
| Methyl ethyl ketone | 75 parts by weight |
| Methyl isobutyl ketone | 75 parts by weight |
| Toluene | 75 parts by weight |
| Additive (lubricant, silicone resin) | 0.15 part by weight |

The above film having a magnetic layer was slit to prepare a magnetic tape having a width of ½ inch. Table 1 shows the properties of this magnetic tape.

There was obtained an excellent magnetic tape which had a relatively small thickness as small as 14 µm, but was scarcely damaged on the surface. The tape hardly had an influence on the VTR screen.

EXAMPLE 2

Pellets of PEN containing spherical fine silica particles were dried at 170° C. for 4 hours in the same manner as in Example 1. The pellets were melt-extruded by a usual method to obtain an unstretched film having a thickness of 400 µm. This unstretched film was stretched in the longitudinal direction at 120° C. at a stretch ratio of 2.4, and then stretched in the transverse direction at 135° C. at a stretch ratio of 3.9, and the stretched film was directly subjected to the first-stage heat setting treatment at 160° C. The film was heated up to 170° C. by passing it through several stages of heating rolls and stretched in the longitudinal direction at a stretch ratio of 2.4. Then, the film was introduced into a tenter oven, and gradually stretched in the transverse direction at a stretch ratio of 1.8 under atmosphere at 190 to 200° C., and the film was directly heat-treated at 200° C. Thereafter the film was treated in the same manner as in Example 1 to give a tape having a thickness of 14 µm.

Table 1 shows the properties of the magnetic tape.

The properties of the tape were excellent, no damage occurred on the tape, and its electromagnetic conversion characteristic was excellent. The skew characteristic thereof was remarkably as good as 3 µsec.

EXAMPLES 3–4

Example 2 was repeated except that the PEN was replaced with PEN containing silicone particles in Example 3, and Example 2 was repeated except that the PEN was replaced with PEN containing particles of crosslinked polystyrene in Example 4, to give films. These films were treated in the same manner as in Example 1 to form tapes.

The tapes showed excellent properties, no damage occurred on the tapes, and the electromagnetic conversion characteristic and skew were excellent. Table 1 shows the results.

Comparative Examples 1–2

Example 2 was repeated except that the PEN was replaced with PEN containing 0.2% by weight of calcium carbonate particles having an average particle diameter of 0.4 µm (Comparative Example 1), and Example 2 was repeated except that the PEN was replaced with PEN containing 0.2% by weight of kaolin particles having an average particle diameter of 0.53 µm (Comparative Example 2), to give films. The films were treated in the same manner as Example 1 to form tapes. However, the resultant tapes had defects on running properties and abrasion, and no satisfactory electromagnetic conversion characteristic was obtained. Table 1 shows the results.

Comparative Example 3

Example 2 was repeated except that the Young's modulus (EM) of a film in the longitudinal direction was set at 520 kg/mm² and that the Young's modulus thereof in the transverse direction was set at 1,080 kg/mm².

The above-obtained film showed low electromagnetic conversion characteristic and large skew. That was because the tape had insufficient strength in the longitudinal direction and strained in the longitudinal direction. Table 1 shows the results.

Comparative Example 4

Example 2 was repeated except that a tape was formed from a film which had not been treated for decreasing the heat shrinkage in the longitudinal direction.

The above-obtained tape showed extraordinary large skew and was unsatisfactory. Table 1 shows the results.

TABLE 1

| Polymer | Unit | Example 1 PEN | Example 2 PEN | Example 3 PEN | Example 4 PEN | Comp. Example 1 PEN | Comp. Example 2 PEN | Comp. Example 3 PEN | Comp. Example 4 PEN |
|---|---|---|---|---|---|---|---|---|---|
| Kind | — | Spherical silica | Spherical silica | Silicone | Crosslinked polystyrene | Calcium carbonate | Kalion | Spherical silica | Spherical silica |
| Average particle diameter | µm | 0.27 | 0.27 | 0.26 | 0.26 | 0.40 | 0.53 | 0.27 | 0.27 |
| Relative standard | — | 0.09 | 0.09 | 0.1 | 0.10 | 0.54 | 0.57 | 0.09 | 0.09 |

TABLE 1-continued

| Polymer | Unit | Example 1 PEN | Example 2 PEN | Example 3 PEN | Example 4 PEN | Comp. Example 1 PEN | Comp. Example 2 PEN | Comp. Example 3 PEN | Comp. Example 4 PEN |
|---|---|---|---|---|---|---|---|---|---|
| deviation (s/d) | | | | | | | | | |
| Amount | — | 0.20 | 0.20 | 0.13 | 0.12 | 0.20 | 0.12 | 0.20 | 0.20 |
| Volume shape factor | — | 0.5 | 0.5 | 0.48 | 0.47 | 0.30 | 0.10 | 0.5 | 0.5 |
| Base film properties | | | | | | | | | |
| Film thickness | μm | 10 | 10 | 10 | 10 | 10 | 10 | 10 | 10 |
| Young's modulus: EM | kg/mm$^2$ | 650 | 690 | 690 | 690 | 690 | 690 | 520 | 690 |
| Young's modulus: ET | kg/mm$^2$ | 890 | 950 | 950 | 940 | 950 | 950 | 1080 | 940 |
| Surface roughness (Ra) | nm | 9 | 9 | 9 | 8 | 13 | 15 | 9 | 9 |
| Friction coefficient (μk) | — | 0.31 | 0.28 | 0.32 | 0.32 | 0.38 | 0.37 | 0.30 | 0.30 |
| Heat shrinkage (longitudinal direction) 70° C. × 1 hr | % | 0.03 | 0.03 | 0.03 | 0.03 | 0.03 | 0.03 | 0.03 | 0.15 |
| Abrasion resistance | — | ⊚ | ⊚ | ⊚ | ⊚ | XX | X | ○ | ○ |
| Magnetic tape characteristic | | | | | | | | | |
| Electromagnetic conversion characteristic | dB | +9.0 | +9.0 | +8.8 | +9.0 | +3.0 | +2.0 | +6.0 | +9.0 |
| Drop-out | piece/min | 6 | 6 | 7 | 7 | 20 | 25 | 6 | 6 |
| Durability (tape damage) (frequency of damage occurrence) | | ○ | ○ | ○ | ○ | Δ | Δ | ○ | ○ |
| Skew | μsec | 3 | 3 | 3 | 3 | 3 | 3 | 6 | 12 |
| Total evaluation | — | ⊚ | ⊚ | ⊚ | ⊚ | X | X | X | X |

Example 5

Pellets of polyethylene-2,6-naphthalate (homopolymer: PEN) containing 0.20% by weight of spherical fine silica particles having an average particle diameter of 0.27 μm, and having an intrinsic viscosity of 0.62 were dried at 170° C. for 4 hours. The pellets were melt-extruded by a usual method to obtain an unstretched film having a thickness of 290 μm. The unstretched film was consecutively biaxially stretched at a stretch ratio of 5.2 in the longitudinal direction at 130° C. and at a stretch ratio of 5.0 in the transverse direction at 135° C. Further, the stretched film was stretched in the transverse direction at a stretch ratio of 1.35 while it was heat set at 200° C. Then, the heat set, biaxially oriented polyethylene-2,6-naphthalate film was heated up to 110° C. with a heating roll, and then its heat shrinkage in the longitudinal direction was adjusted to 0.03% by adjusting the tension thereof between the heating roll and a cooling roll. The so-obtained film had a thickness of 8.3 μm.

A magnetic coating composition containing the same components as those in Example 1 was applied to the above-obtained biaxially oriented film with a gravure roll, and smoothened with a doctor knife. Before the magnetic coating composition was dried, it was magnetically oriented by a usual method. Then, the film was introduced into an oven, and the magnetic coating composition was dried and cured. Further, the film was calender-processed to give a coating having a uniform thickness of about 4 μm.

The above film having a magnetic layer was slitted to prepare a magnetic tape having a width of ½ inch. Table 2 shows the properties of this magnetic tape.

There was obtained an excellent magnetic tape which had a relatively small thickness as small as 12 μm, but was scarcely damaged on the surface. The tape hardly had an influence on the VTR screen.

Example 6

Pellets of PEN containing spherical fine silica particles were dried at 170° C. for 4 hours in the same manner as in Example 5. The pellets were melt-extruded by a usual method to obtain an unstretched film having a thickness of 280 μm. This unstretched film was stretched in the longitudinal direction at 120° C. at a stretch ratio of 2.3, and then stretched in the transverse direction at 135° C. at a stretch ratio of 3.9, and the stretched film was directly subjected to the first-stage heat setting treatment at 160° C. The film was heated up to 170° C. by passing it through several stages of heating rolls and stretched in the longitudinal direction at a stretch ratio of 2.2. Then, the film was introduced into a tenter oven, and gradually stretched in the transverse direction at a stretch ratio of 1.7 under atmosphere at 190 to 200° C., and the film was directly heat-treated at 200° C. Further, the film was treated in the same manner as in Example 5 to give a tape having a thickness of 12 μm.

Table 2 shows the properties of the magnetic tape.

The properties of the tape were excellent, no damage occurred on the tape, and its electromagnetic conversion characteristic was excellent. The skew characteristic thereof was remarkably as good as 3 μsec.

Examples 7–8

Example 6 was repeated except that the PEN was replaced with PEN containing silicone particles in Example 7, and Example 6 was repeated except that the PEN was replaced with PEN containing particles of crosslinked polystyrene in Example 8, to give films. These films were treated in the same manner as in Example 5 to form tapes.

The tapes showed excellent properties, no damage occurred on the tapes, and the electromagnetic conversion characteristic and skew were excellent. Table 2 shows the results.

Comparative Examples 5–6

Example 6 was repeated except that the PEN was replaced with PEN containing 0.2% by weight of calcium carbonate particles having an average particle diameter of 0.4 μm (Comparative Example 5), and Example 2 was repeated except that the PEN was replaced with PEN containing 0.12% by weight of kaolin particles having an average particle diameter of 0.53 μm (Comparative Example 6), to give films. The films were treated in the same manner as Example 5 to form tapes. However, the resultant tapes had problems on running properties and abrasion, and no satisfactory electromagnetic conversion characteristic was obtained. Table 2 shows the results.

Comparative Example 7

Example 6 was repeated except that the Young's modulus (EM) of a film in the longitudinal direction was set at 520 kg/mm$^2$ and that the Young's modulus thereof in the transverse direction was set at 1,100 kg/mm$^2$.

The above-obtained film showed low electromagnetic conversion characteristic and large skew. That was because the tape had insufficient strength in the longitudinal direction and strained in the longitudinal direction. Table 2 shows the results.

Comparative Example 8

Example 6 was repeated except that a tape was formed from a film which had not been treated for decreasing the heat shrinkage in the longitudinal direction.

The above-obtained tape showed extraordinary large skew and was unsatisfactory. Table 2 shows the results.

TABLE 2

| | Unit | Example 5 | Example 6 | Example 7 | Example 8 | Comp. Example 5 | Comp. Example 6 | Comp. Example 7 | Comp. Example 8 |
|---|---|---|---|---|---|---|---|---|---|
| Kind | — | Spherical silica | Spherical silica | Silicone | Crosslinked polystyrene | Calcium carbonate | Kaolin | Spherical silica | Spherical silica |
| Average particle diameter | μm | 0.27 | 0.27 | 0.26 | 0.26 | 0.40 | 0.53 | 0.27 | 0.27 |
| Relative standard deviation (s/d) | — | 0.09 | 0.09 | 0.10 | 0.10 | 0.54 | 0.57 | 0.09 | 0.09 |
| Amount | — | 0.20 | 0.20 | 0.13 | 0.12 | 0.20 | 0.12 | 0.20 | 0.20 |
| Volume shape factor | — | 0.5 | 0.5 | 0.48 | 0.47 | 0.3 | 0.1 | 0.5 | 0.5 |
| Base film properties | | | | | | | | | |
| Film thickness | μm | 8.3 | 8.3 | 8.3 | 8.3 | 8.3 | 8.3 | 8.3 | 8.3 |
| Young's modulus: EM | kg/mm$^2$ | 700 | 680 | 680 | 690 | 680 | 680 | 520 | 690 |
| Young's modulus: ET | kg/mm$^2$ | 900 | 930 | 930 | 920 | 930 | 930 | 1100 | 920 |
| Surface roughness (Ra) | nm | 9 | 9 | 9 | 8 | 13 | 15 | 9 | 9 |
| Friction coefficient (μk) | — | 0.29 | 0.30 | 0.33 | 0.32 | 0.38 | 0.37 | 0.30 | 0.30 |
| Heat shrinkage (longitudinal direction) 70° C. × 1 hr | % | 0.03 | 0.03 | 0.03 | 0.03 | 0.03 | 0.03 | 0.03 | 0.15 |
| Abrasion resistance | — | ⊚ | ⊚ | ⊚ | ⊚ | XX | X | ○ | ○ |
| Magnetic tape characteristic | | | | | | | | | |
| Electromagnetic conversion characteristic | dB | +9.0 | +9.0 | +8.8 | +9.0 | +3.0 | +2.0 | +6.0 | +9.0 |
| Drop-out | piece/min | 6 | 6 | 7 | 7 | 20 | 25 | 6 | 7 |
| Durability (tape damage) (frequency of damage occurrence) | | ○ | ○ | ○ | ○ | Δ | Δ | ○ | ○ |
| Skew | μsec | 3 | 3 | 3 | 3 | 3 | 3 | 6 | 12 |
| Total evaluation | — | ⊚ | ⊚ | ⊚ | ⊚ | X | X | X | X |

According to the present invention, there can be provided a biaxially oriented, unidirectionally long polyethylene-2,6-naphthalate film useful as a base film for forming a magnetic recording medium whose tape thickness is 16 μm or less, but which is excellent in running properties and durability, hardly shows fluctuation in output and is improved in skew distortion. As a result, the above film, when used as a base film, permits decreasing the thickness of a magnetic recording tape of a long-time recording cassette for home-use VTRs and allows recording for a long period of time.

We claim:

1. A biaxially oriented, polyethylene-2,6-naphthalate film having a longer length in the longitudinal direction than width in the transverse direction, and (A) having a Young's modulus of at least 550 kg/mm$^2$ in the longitudinal direction and a Young's modulus of at least 800 kg/mm² in the transverse direction, the Young's modulus in the transverse direction being greater than the Young's modulus in the longitudinal direction by more than 200 kg/mm², (B) containing 0.005 to 2.0% by weight of fine particles having a volume shape factor of 0.3 to π/6, a relative standard deviation of 0.5 or less and an average particle diameter of 0.2 to 2.5 μm, (C) having a heat shrinkage in the longitudinal direction, after heat treatment at 70° C. for 1 hour under no load, of 0.1% or less, and (D) having a surface roughness, Ra of 1 to 12 nm.

2. A biaxially oriented film according to claim 1, wherein the fine particles are at least one type of particles selected from the group consisting of monodisperse silica particles, silicone resin particles and crosslinked polystyrene particles.

3. A biaxially oriented film according to claim 1, wherein in addition to said fine particles, the film further contains other inert particles.

4. A magnetic tape comprising a magnetic layer on one surface of the biaxially oriented polyethylene-2,6-naphthalate film recited in claim 1.

5. A biaxially oriented film according to claim 1, having a film thickness of from 2 to 12 μm.

6. A biaxially oriented, polyethylene-2,6-naphthalate film having a longer length in the longitudinal direction than width in the transverse direction, and (A) having a Young's modulus of at least 600 kg/mm² in the longitudinal direction and a Young's modulus of at least 800 kg/mm² in the transverse direction, the Young's modulus in the transverse direction being greater than the Young's modulus in the longitudinal direction by more than 200 kg/mm², (B) having a heat shrinkage, after heat treatment at 70° C. for 1 hour under no load, of 0.1% or less, and (C) having a surface roughness, Ra of 12 nm or less, (D) containing 0.01 to 2.0% by weight of fine particles having an average particle diameter of 0.2 to 2.5 μm, a volume shape factor of 0.3 to π/6, and a relative standard deviation of 0.5 or less, and (E) having a film thickness of 2 to 19 μm.

7. A biaxially oriented film according to claim 6, having a film thickness of 2 to 12 μm.

8. A biaxially oriented film according to claim 6, wherein the fine particles are at least one type of particles selected from the group consisting of monodisperse silica particles, silicone resin particles and crosslinked polystyrene particles.

9. A magnetic tape comprising a magnetic layer on one surface of the biaxially oriented polyethylene-2,6-naphthalate film recited in claim 6.

10. A biaxially oriented polyethylene-2,6-naphthalate film having a longer length in the longitudinal direction than width in the transverse direction, and (A) having a Young's modulus of at least 550 kg/mm² in the longitudinal direction and a Young's modulus at least 800 kg/mm² in the transverse direction, the Young's modulus in the transverse direction being greater than the Young's modulus in the longitudinal direction by more than 200 kg/mm², (B) containing 0.005 to 2.0% by weight of fine particles having a volume shape factor of 0.3 to π/6, a relative standard deviation of 0.5 or less and an average particle diameter of 0.2 to 2.5 μm, (C) having a heat shrinkage in the longitudinal direction, after heat treatment at 70° C. for 1 hour under no load, of 0.1% or less, (D) having a surface roughness, Ra of 1–12 nm, and (E) having a film thickness of 2 to 12 μm.

11. A magnetic tape comprising a magnetic layer on one surface of biaxially oriented polyethylene-2,6-naphthalate film having a longer length in the longitudinal direction than width in the transverse direction, and (A) having a Young's modulus of at least 600 kg/mm² in the longitudinal direction and a Young's modulus at least 800 kg/mm² in the transverse direction, the Young's modulus in the transverse direction being greater than the Young's modulus in the longitudinal direction by more than 200 kg/mm², (B) having a heat shrinkage in the longitudinal direction, after heat treatment at 70° C. for 1 hour under no load, of 0.08% or less, (C) having a surface roughness, Ra of 1–12 nm, (D) containing 0.01 to 2.0% by weight of fine particles having an average particle diameter of 0.2 to 1.0 μm, a volume shape factor of 0.3 to π/6, and a relative standard deviation of 0.5 or less, and (E) having a film thickness of 2 to 19 μm.

12. A magnetic tape comprising a magnetic layer on one surface of biaxially oriented polyethylene-2,6-naphthalate film having a longer length in the longitudinal direction than width in the transverse direction, and (A) having a Young's modulus of at least 550 kg/mm² in the longitudinal direction and a Young's modulus at least 800 kg/mm² in the transverse direction, the Young's modulus in the transverse direction being greater than the Young's modulus in the longitudinal direction by more than 200 kg/mm², (B) containing 0.12 to 0.20% by weight of fine particles having a volume shape factor of 0.47–0.50, a relative standard deviation of 0.09 to 0.10 and an average particle diameter of 0.26 to 0.27 μm, said fine particles being selected from the group consisting of mono dispersed silica particles, silicone resin particles and crosslinked polystyrene particles, (C) having a heat shrinkage in the longitudinal direction, after heat treatment at 70° C. for 1 hour under no load, of 0.08% or less, (D) having a surface roughness, Ra of 1–12 nm, and (E) having a film thickness of 2 to 12 μm.

* * * * *